United States Patent [19]

Dion

[11] Patent Number: 4,463,256

[45] Date of Patent: Jul. 31, 1984

[54] METHOD FOR DETERMINING THE PRESENCE OF PLATINUM IN EARTH FORMATIONS

[75] Inventor: Eric P. Dion, Dallas, Tex.

[73] Assignee: Mobil Oil Corporation, New York, N.Y.

[21] Appl. No.: 434,444

[22] Filed: Oct. 15, 1982

[51] Int. Cl.$^3$ ............................................. G01V 5/00
[52] U.S. Cl. .................................... 250/256; 250/253
[58] Field of Search ....................... 250/253, 256, 255

[56] References Cited

U.S. PATENT DOCUMENTS 3,940,610  2/1976  Dennis et al. .................... 250/369
4,071,755  1/1978  Supernaw et al. ................ 250/253

Primary Examiner—Janice A. Howell
Attorney, Agent, or Firm—A. J. McKillop; Michael G. Gilman; George W. Hager, Jr.

[57] ABSTRACT

A spectral natural gamma radiation logging tool is calibrated with a material of known potassium content so that the natural gamma radiation measured by such logging tool is related to potassium concentration. The earth formations surrounding a borehole are logged with such logging tool to identify the presence of potassium. A specified concentration of potassium correlates inversely with a magnetic mineral content in the earth formation. The amount of magnetic mineral content is a measure of the presence of the non-magnetic mineral platinum in the earth formation.

12 Claims, 4 Drawing Figures

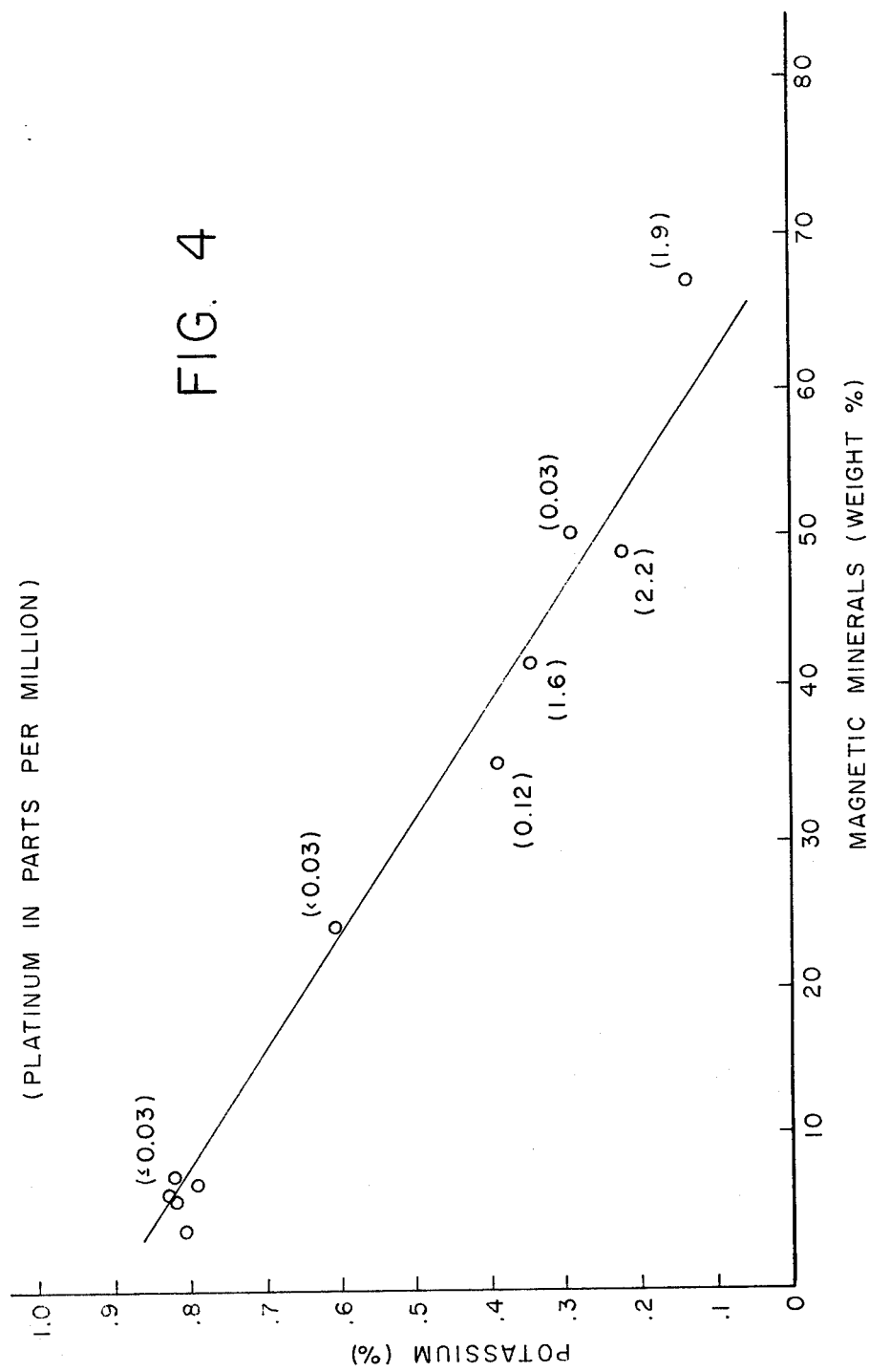

METHOD FOR DETERMINING THE PRESENCE OF PLATINUM IN EARTH FORMATIONS

BACKGROUND OF THE INVENTION

Heavy minerals, such as platinum and gold, are often found in association with magnetic igneous rock and are concentrated into placer deposits by chemical and physical weathering processes. Although such heavy minerals are not magnetic in themselves, they are frequently found in surface and subsurface deposits bearing magnetic minerals. For example, it is known that platinum and gold bearing placer mineral deposits often contain magnetite and chromite. The quantity of magnetite and/or chromite can be used as a prospecting guide for deposits enriched in platinum or gold.

Previous prospecting techniques for such heavy minerals have employed geochemical methods, primarily chemical analysis of core samples in the laboratory. Also magnetometers have been used to take advantage of the close association of platinum and gold with magnetite and chromite (see *Introduction to Geophysical Prospecting*, McGraw-Hill Book Company, Inc., New York, 1960, pages 315-316).

BRIEF DESCRIPTION OF THE DRAWINGS

FIG. 4 sets forth specific examples of earth formation core samples tested for percent magnetic mineral and potassium content in the presence of platinum.

SUMMARY OF THE INVENTION

In accordance with the present invention, there is provided a method for determining the presence of platinum associated with magnetic materials in earth formations.

A spectral gamma-ray analysis system is calibrated with a specified mineral of known gamma-ray emitting content, such as potassium, uranium or thorium, whose presence bears a known correlation to the content of select magnetic minerals in earth formations, such as magnetite or chromite. The gamma-ray output of such system is a measure of the concentration of the specified mineral. At least a sample of an earth formation is measured for natural gamma radiation with such system. The presence of platinum is identified when the measured gamma radiation indicates a concentration of the specified mineral correlating with a magnetic material content of a specified weight percent. For example, a magnetic mineral content of at least 25% by weight of magnetite or chromite indicates a platinum concentration of at lest 0.03 parts per million. Such at least 25% magnetic material content correlates with a potassium concentration of no greater than 0.6%.

DESCRIPTION OF THE PREFERRED EMBODIMENT

In accordance with the present invention there is provided a method for heavy mineral identificaton based on magnetic content.

It has been found that core samples with more than 25% magnetic minerals by weight also contain more than 0.03 parts per million (ppm) platinum. The presence of magnetic minerals above 25% does not specifically quantify platinum content, but it does predict the presence of platinum at a level greater than 0.03 ppm. The magnetic mineral fraction is predominately magnetite with an unknown proportion of chromite. The presence of magnetite and chromite is, therefore, an indication of the presence of platinum.

It has been further found that magnetite, and chromite do not contain potassium, uranium or thorium. As the percentage of magnetite and chromite contained in a formation is increased, the percentage of any radioactive component is decreased. It is a specific feature of the present invention to utilize this inverse relationship between magnetic mineral content and potassium, uranium or thorium content as an indirect measurement of the platinum contact of the formation.

Figure 1:
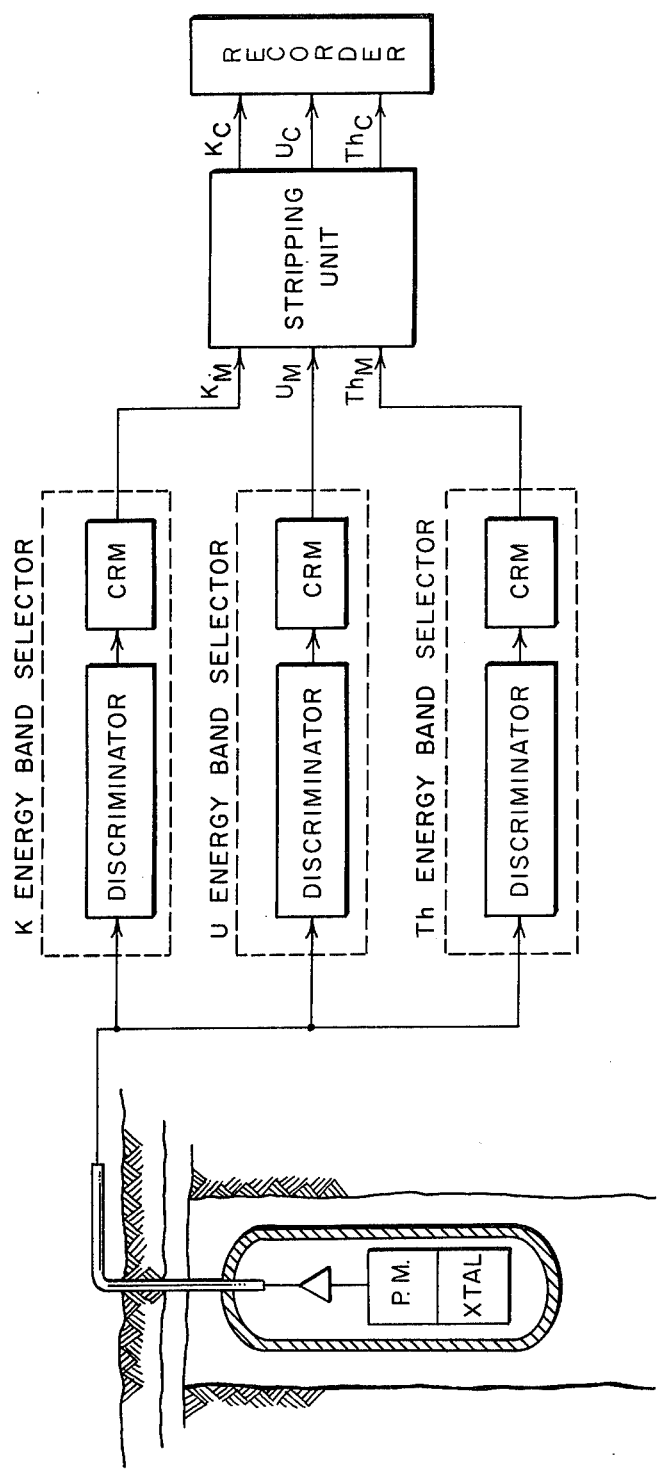
FIG. 1 illustrates a natural gamma radiation analysis system for use in the present invention.

In carrying out the potassium content measurement a spectral gamma analysis is performed. A gamma-ray detector provides a measurement of total natural gamma radiation. Potassium, uranium and thorium are important natural sources of gamma radiation. However, each of these elements either contains or radioactively decays to, radioactive isotopes which emit gamma radiation at characteristic energy levels. A natural gamma-ray spectrum will therefore exhibit peaks of gamma-ray intensities corresponding to the potassium, uranium and thorium contents. One such system that has been successfully utilized in carrying out such a gamma-ray analysis is set forth in FIG. 1 and more fully described in U.S. Pat. No. 3,940,610 which describes a borehole logging system for measuring the natural gamma radiation from formations surrounding a borehole. However such a system could be adapted for use on the surface of an outcrop of an earth formation or on core samples taken from an earth formation or outcrop. The system of FIG. 1 or any other conventional spectral gamma-ray measuring system can be calibrated or standardized so that the potassium, uranium or thorium count rate output is directly related to potassium, uranium or thorium percent weight by calibrating the system in one or more calibration models having materials of known potassium, uranium or thorium contents.

Figure 2:
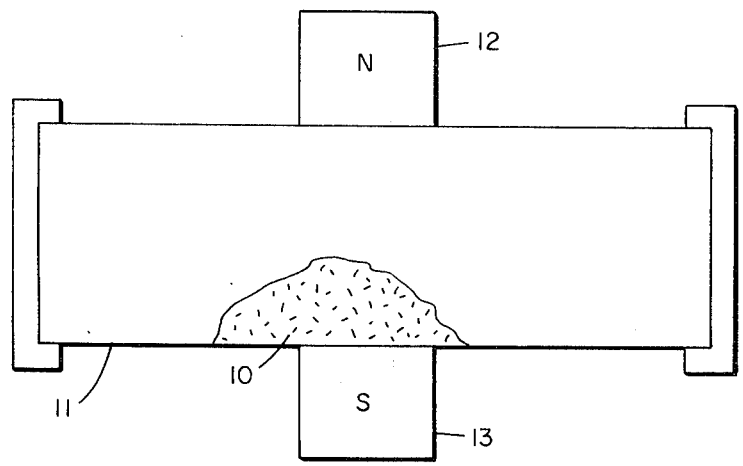
FIG. 2 illustrates a system for magnetizing the magnetic mineral components of a sample of earth formation.
Figure 3:
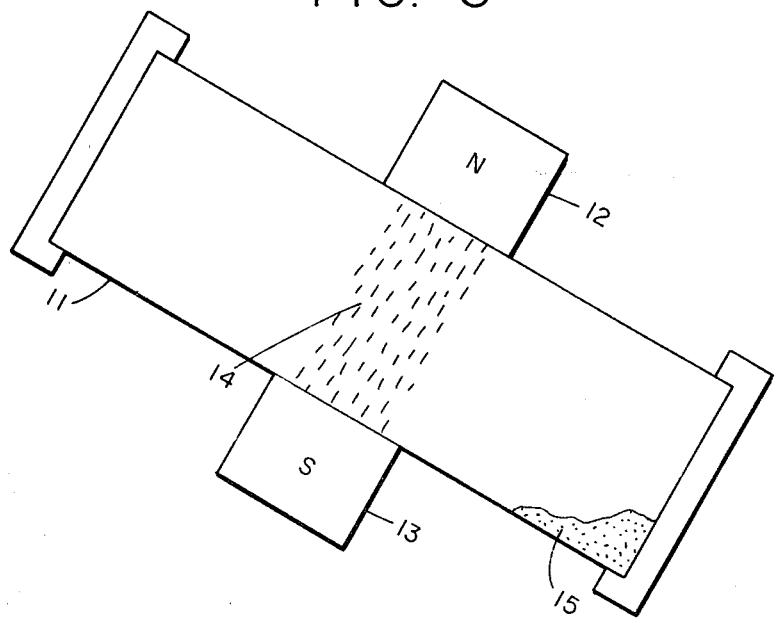
FIG. 3 illustrates a means for separating the magnetized from the non-magnetized mineral components of the earth formation sample while still under the magnetizing influence of the system of FIG. 2.

FIG. 2 illustrates a method for carrying out magnetic material content measurements. An unconsolidated mixture 10 of a core sample of the non-magnetic and magnetic materials in the earth formation is placed in container 11, subjected to a magnetizing field from the N and S poles 12 and 13 respectively, of a permanent magnet, and agitated. An electromagnet may be used equally well. While still under the influence of such magnetizing field, the container 11 may be tilted thereby separating the magnetic and non-magnetic contents, 14 and 15 respectively, as shown in FIG. 3, the magnetic contents 14 being held in place by the magnetizing field between the N and S poles 12 and 13 respectively. The weights of the magnetic and non-magnetic portions are then measured and the percentage of the magnetic portion determined.

FIG. 4 sets forth specific examples of core samples tested for percent magnetic minerals and potassium content. Each of the samples were then laboratory tested for platinum content and such content in parts per million (ppm) is shown in parentheses for each sample point in FIG. 1. It can be seen that the presence of magnetic material above about 25% by weight correlates with a potassium content of below about 0.6% which, as previously noted, may be used to indicate the presence of platinum at or above the 0.03 ppm level.

The foregoing merely describes one embodiment of the present invention. It is to be understood that various modifications, as well as alternate embodiments, may become apparent to one skilled in the art without departing from the scope and spirit of the invention as hereinafter defined by the appended claims.

I claim:

1. A method for determining the presence of platinum associated with magnetic materials in earth formations, comprising the steps of:
   (a) calibrating a spectral gamma-ray analysis system with a specified mineral of known gamma-ray emitting content whose presence bears a known correlation to the content of select magnetic minerals in earth formations, whereby the gamma-ray count rate of said spectral gamma-ray analysis system is related to the concentration of said specified mineral,
   (b) measuring the natural gamma radiation of at least a sample of said earth formation with said calibrated spectral gamma-ray analysis system, and
   (c) identifying the presence of platinum in said at least a sample of said earth formation when the measured natural gamma radiation relates to a concentration of the specified mineral correlating with a magnetic material content of a specified weight percent.

2. The method of claim 1 wherein said spectral gamma-ray analysis system includes a borehole logging tool and the measurement of natural gamma radiation is carried out within the earth formation surrounding a borehole.

3. The method of claim 1 wherein said at least a sample of said earth formation is identified as containing platinum in a concentration of at least 0.03 parts per million when the measured natural gamma radiation indicates a concentration of the specified mineral correlating with a magnetic material content of at least 25% by weight.

4. The method of claim 1 wherein said specified radioactive mineral contains potassium.

5. The method of claim 1 wherein said specified radioactive mineral contains uranium.

6. The method of claim 1 wherein said specified radioactive mineral contains thorium.

7. The method of claim 1 wherein said magnetic material is magnetite.

8. The method of claim 1 wherein said magnetic material is chromite.

9. The method of claim 1 wherein said magnetic material is a combination of magnetite and chromite.

10. A method for determining the presence of platinum associated with magnetic minerals in earth formations, comprising the steps of:
    (a) calibrating a spectral gamma-ray analysis system with a material of known potassium content so that the gamma-ray count rate of said spectral gamma-ray analysis system is related to potassium concentration; and
    (b) identifying the presence of platinum in said at least a sample of said earth formation in a concentration of at least 0.03 parts per million when the measured natural gamma-radiation relates to a potassium concentration of less than 0.6%.

11. The method of claim 10 wherein said spectral gamma-ray analysis system includes a borehole logging tool and the measurement of natural gamma radiation is carried out within the earth formation surrounding a borehole.

12. The method of claim 10 wherein said spectral gamma-ray analysis system is placed on the surface of an outcrop of the earth formation for the measurement of natural gamma-radiation.

* * * * *